May 28, 1940.  R. G. AVERILL  2,202,723

TROLLEY TENDER

Filed Jan. 17, 1939

Inventor
REX G. AVERILL
By
Attorney

Patented May 28, 1940

2,202,723

UNITED STATES PATENT OFFICE 2,202,723

TROLLEY TENDER

Rex G. Averill, Mansfield, Ohio, assignor to The Ohio Brass Company, Mansfield, Ohio, a corporation of New Jersey Application January 17, 1939, Serial No. 251,395

5 Claims. (Cl. 191—93)

My invention relates to trolley tenders in which is combined the principles of a trolley catcher and a trolley retriever.

One object of my invention is to provide a device which is capable of maintaining the trolley rope slightly taut, to restrain the trolley pole from rising to a dangerous height when the current collector leaves the wire and to quickly retrieve or lower the trolley pole below the overhead structure by drawing in the rope.

Another object of my invention is to provide a trolley tender in which the amount of rope retrieved each time will be uniform, that is, the retrieving mechanism may be reset each time to a predetermined standard.

Other objects and advantages of my invention will be disclosed as I proceed with the description of my invention.

My invention resides in the new and novel construction, combination and relation of the various parts hereinafter described and shown in the drawing accompanying this specification.

Figure 1:
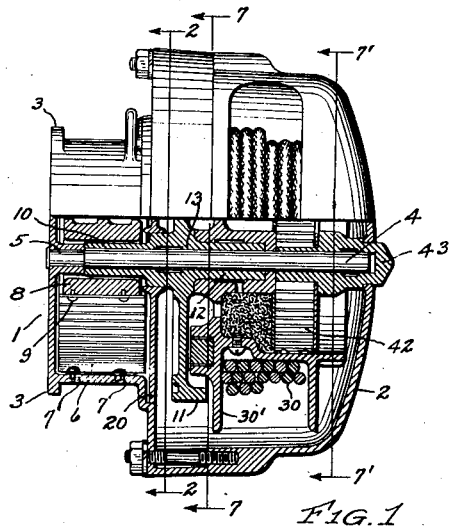
Fig. 1 is a top view of my invention in partial section.

My invention comprises an improvement of the device shown in Larsson Patent 1,923,314, dated August 22, 1933. In the Larsson device the amount of reset after the device has retrieved is variable while in my invention the amount of reset is definite and of a predetermined amount and is not subject to control by the operator.

To bring about my improvement, I make use of the diameter of the retrieving spring when in a wound and in an unwound condition and these limits are practically constant as the diameter to which the retrieving spring will unwind and the diameter to which it is rewound by the operator are beyond his control and the mechanism provides that before the device can be locked in its set position to retrieve, the spring must be wound to a predetermined diameter.

In the preferred embodiment of my invention I provide a casing having a back portion 1 and a removable cover 2 held in place by bolts or screws, etc. The back portion 1 is provided with lugs 3 adapted to fit a holder which in turn is secured to a street car or trolley bus. The retriever is removable from the holder so that it may be used on either end of the car as desired.

Fixedly secured to the back wall of the case 1 is a spindle 4 which has a reduced portion 5 held in any suitable manner as by a transverse pin, riveting or welding. Mounted within the rear portion of the case 1 is the retrieving spring 6 having one end secured to the side wall of the casing by means of rivets 7 and secured to a collar or sleeve 8 by means of rivets 9. The sleeve 8 has a squared passage therethrough to receive the end of the shaft 10 which is squared to fit the passage in the sleeve 8 so that the members 8 and 10 will rotate together.

As later described the spring 6 is rewound when the trolley rope is withdrawn from the retriever and this, of course, retensions the spring 6.

Figure 4:
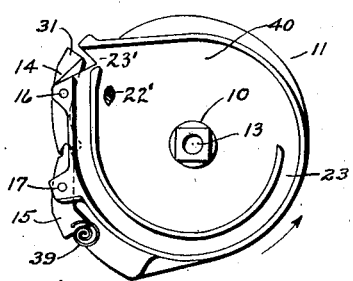
Fig. 4 is a rear face view of the retrieving disk showing the resetting control groove.
Figure 5:
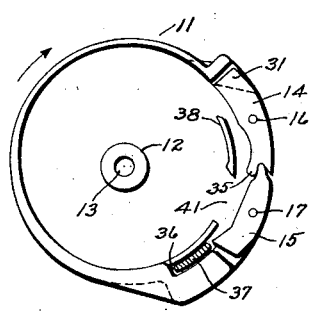
Fig. 5 is a front face view of the retrieving disk with pivoted dogs thereon shown in position after the device has retrieved the trolley rope and the retrieving disk and rope reel are interlocked for unitary rotation.
Figure 6:
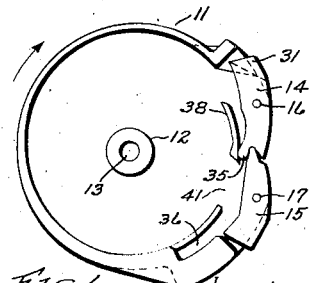
Fig. 6 is a front face view of the retrieving disk with the dogs shown in position to lock the retrieving mechanism in position to retrieve the trolley rope as soon as the mechanism is tripped by a flying pole.

Mounted upon the central portion of the shaft 4 is a retrieving disk 11 shown also in Figs. 4, 5 and 6. The disk has a shaft projecting both rearwardly and forwardly of the disk proper. The portion 10 projects rearwardly and the portion 12 projects forwardly and both portions are provided with the bore 13 to receive the shaft 4 upon which the disk rotates.

The disk 11 is provided with two dogs 14 and 15 pivotally mounted at 16 and 17 and interlocked at their adjacent ends to provide movement in unison.

When the dogs 14 and 15 are in the position shown in Fig. 6 (see also Fig. 7), they will engage respectively with the stop lugs 18 and 19, integral parts of the casing 1, and in which position the dog 14 will be held against the stop lug 18 by the tension in the retrieving spring 6 which is now in its wound condition and exerting an effort to rotate the disk 11 and in turn to rotate the rope reel upon which the rope is wound at the proper time as later described.

Figure 2:
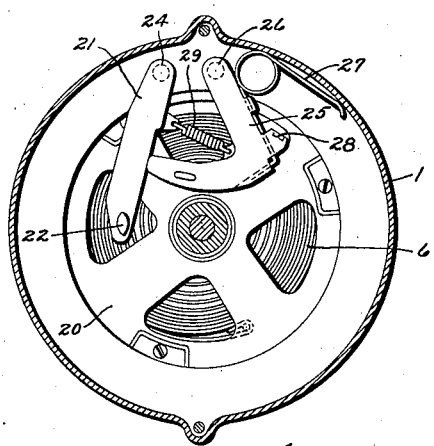
Fig. 2 is a section taken on the line 2—2 of Fig. 1 showing the retrieving spring and a portion of the resetting mechanism in a retrieved condition relative to other parts.
Figure 3:
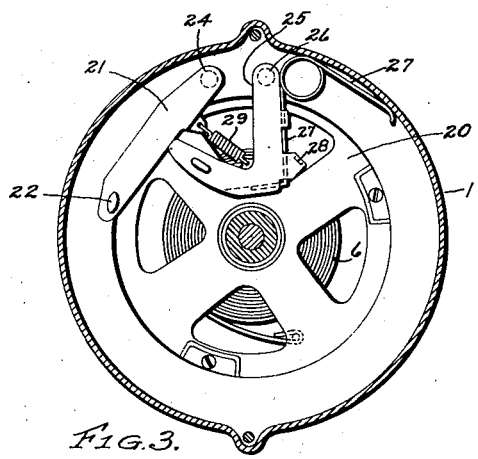
Fig. 3 is a section corresponding to Fig. 2 taken on the line 2—2 of Fig. 1 showing the retrieving spring and resetting mechanism in a set condition for retrieving the trolley rope.

The retrieving spring 6 is partially closed off from the front portion of the device by means of a perforated disk 20 held in position to the case 1 by screws or other suitable means (see Fig. 3). Pivotally mounted upon the casing is an arm 21 shown in its retrieved position in Fig. 2 and a reset position in Fig. 3. The arm 21 is provided with a projecting lug 22 which is adapted to move in the groove 23 when in the position shown in Fig. 3.

Associated with the arm 21 is a lever 25 pivoted to the case 1 at 26, in like manner as arm 21 is pivoted to the case at 24. The lever 25 has a portion engaging the arm 21 and the spring 27 is pressing the lever 25 about its pivot and in the direction of the arm 21, the tendency being to move the arm 21 about its pivot 24 from the position shown in Fig. 2 to that shown in Fig. 3.

The lever 25 is provided with a rearwardly projecting lug 28 which overlaps and engages the outer surface of the retrieving spring 6 and through the combined action of the lug 28 pressing against the spring 6 and the spring 27 the lever 25 moves in unison with the spring 6 as it increases or decreases in diameter and likewise the arm 21 since it is controlled by the lever 25. The spring 29 holds the arm 21 against the end of the lever 25 thereby assuring movement of the arm 21 in unison with that of the lever 25.

In Fig. 2 the retrieving spring 6 is shown in its unwound condition and its diameter is as great as the recess in which it is positioned will permit and the lug 28 engaging the spring 6 has caused the lever 25 to move to one of its extreme positions and the arm 21 has followed such movement and the lug 22 has now moved out of the groove 23. The description of the parts just given (Fig. 2) is that when the device has been tripped and has retrieved or wound the rope upon the reel 30'.

In Fig. 3 the parts just described are shown in their relative positions when the retrieving spring 6 has been rewound to its retrieving capacity as by withdrawing the trolley rope from the reel and rotating the reel, disk and spring. It will be noted that through the action of the spring 27 and the lug 28, the lever 25 has moved about its pivot 26 and has also moved the arm 21 about its pivot 24. These parts now represent the relative position of the same after the device has been reset and the trolley rope 30 unwound from the reel 30' thus rewinding the spring 6 and permitting the raising of the trolley pole.

The disk 11 and reel 30' will be locked together as later explained when the device is retrieving and will therefore rotate together in resetting the spring 6 by withdrawing the rope from the reel 30'.

When the disk 11 rotates in the direction of the arrows in Figs. 4 and 5 and with the dogs 14 and 15 in the position shown in Fig. 5, the arm 21 will be moved from the position shown in Fig. 2 to that shown in Fig. 3 as the spring 6 is rewound and after the spring has been rewound a predetermined number of turns the lug 22 on the arm 21 moving outwardly will register with the open end of the groove 23 and further rotation of the reel and disk will finally bring the dogs 14 and 15 to a position where the lug 22 will engage the end 31 of the dog 14, a lug projecting into the path of the groove 23, and force that end of the dog 14 outwardly which in turn operates the dog 15 and the two dogs will take the position shown in Fig. 6. Continued rotation of the disk 11 will engage the end of the dog 15 with the stop 19 on the case 1 thus arresting further rotation of the disk 11 as the spring will then be fully wound and the lug 22 will pass inwardly through the opening 23' due to the spring 29 acting upon the arm 21.

If the disk 11 is now released as by slowly relieving the pull on the rope, the disk will rotate in the opposite direction from the arrows under the action of the spring 6 until the dog 14 engages with the stop 18 on the casing 1 thus holding the disk against further rotation under action of the spring 6 but biased to further rotation should the dog 14 be released from its engagement with the stop 18 and the lug 22 will assume the position 22' in Fig. 4. As just described the retrieving spring 6 and retrieving mechanism has been set for a normal operation of the device, excepting that the reel 30' and disk 11 are still interlocked for unitary rotation.

In the description just given regarding the resetting of the retriever, the disk 11 and reel 30' were locked together. In order to automatically lock the retriever disk 11 and reel 30' together to rotate as a unit under action of the spring 6 when the trolley head leaves the trolley wire, to wind in the trolley rope I provide the reel 30' on its rear face with a plurality of centrifugally operated dogs 32 normally held inwardly by the springs 33 with the end face of the dogs against a stop 34. When the said parts are locked together the retriever may be reset by withdrawing the rope from the reel. When the reel is rotated rapidly in a rope unwinding direction as is the case when the trolley head is dewired and centrifugal dogs 32 will be thrown outwardly and one dog will engage the lower end 35 of the dog 14 (see Fig. 6) thus raising the end 35 and also that of the coacting dog 15 thereby moving the dogs to the position shown in Fig. 5. The free end of each dog 32 is provided with a laterally projecting lug 37 which will ride on the outer surface of the short flange 38 when in the thrown out position thus assisting in throwing the dogs from the position shown in Fig. 6 to that shown in Fig. 5 and as the reel continues to rotate very rapidly the lug 37 will find its way into the pocket 36 before the lug 15 drops sufficiently to prevent its entrance but should this happen the end of the dog 15 is sloped and the lug 37 will have no difficulty in entering the pocket 36 where it will be locked against removal until the retriever has been reset.

At the instant the dogs 14 and 15 are tripped, as just described, from the position shown in Fig. 6 with the dog 14 in engagement with the lug 18 (see Fig. 7) to the position of the dogs 14 and 15 shown in Fig. 5 in which the dog 14 has been released from engagement with the lug 18, the retrieving spring 6 will come into action and rotate the disk 11 and reel 30' in unison and wind up the rope upon the reel thus drawing the trolley pole downwardly.

The over center spring 39 will hold the dogs in either of their two positions.

After the retrieving spring has unwound itself and the disk 11 and reel 30' are still locked together, the projection 22 on the arm 21 will be positioned in the recess 40. If now the trolley rope is withdrawn from the device the reel 30' will be operated as previously explained and the spring 6 gradually rewound or tensioned and the lug 22 will enter the groove 23 after the diameter of the spring has been reduced to a predetermined size and finally will engage the lug 31 on the end of the dog 14 and which might be said to close the end of the groove 23 and the lug 22 will trip the interlocked dog 14 and dog 15 (see Figs. 4 and 5) and drop through the opening 23' and this will complete the resetting of the retriever after the rope has been slacked off slightly to permit the dog 14 to engage the stop 18 and the lug 22 assume the position 22' (Fig. 4) and a little further slacking of the rope will permit the reel to rotate relative to the disk 11 in the rope winding direction until the lug 37 drops through the opening 41 to its normal position (Fig. 7) and permits the rewinding of the rope upon the drum 30' through the action of the slack take up spring 42.

It will be noted that the reel 30' under normal operating conditions is free to rotate upon the portion 12 of the shaft of the retrieving disk 11. The reel is formed hollow and mounted within the reel is the slack take up spring 42 which has one end secured to the reel by means of rivets or otherwise and the other end secured to a support 43 which has a squared end and projects through a square hole in the cover thus preventing rotation of the support 43 and maintaining the inner end of the spring 42 fixed against rotation.

The spring 42 is of sufficient tension to take up the normal slack in the rope due to the usual rise and fall of the trolley head as it moves along the trolley wire and does not interfere at all with the operation of the retrieving spring 6.

The end of the disk shaft 10 being squared and fitting into the squared opening in the collar 8, it will be apparent that the setting of the disk 11 may have any one of four different angular positions relative to the lug 22, therefore, the open end of the groove 23 will have four different positions relative to the lug 22 and this condition permits changing the amount of rewind of the retrieving spring 6 from its maximum rewind by as much as 3/4 of a turn of the reel, however in the majority of cases the disk is set so as to give the greatest number of turns of the reel in a rewinding direction.

Figure 7:
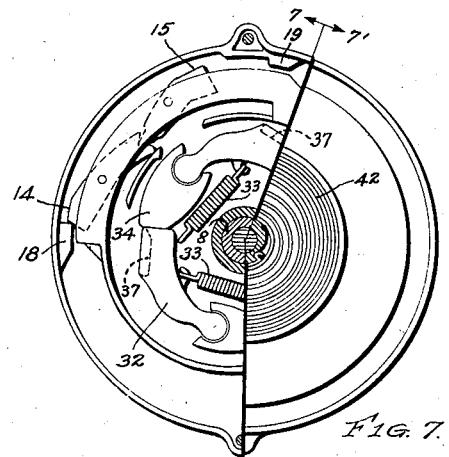
Fig. 7 is a view taken on the lines 7—7 and 7'—7' of Fig. 1 and shows the retrieving disk locked in its set position ready to retrieve the trolley rope when tripped and showing the trolley rope reel free to function to maintain the trolley rope slightly taut.

Other means of anchoring the ends of the spring 6 from that shown in Fig. 1 are disclosed in Figs. 3 and 7.

Having described my invention, those skilled in the art will recognize modifications which may be made, therefore, I wish to be limited only by my claims.

I claim:

1. In a trolley tender of the class described provided with a case including a retrieving spring and a holding mechanism to lock the spring in a wound condition, the combination therewith of means operated by the retrieving spring to control the amount of rewind of the retrieving spring after having retrieved the trolley rope, the said means comprising a lever pivoted at one end to a pin fixed to the case and having a lug engaging the periphery of the spring, a spring urging the lug forward in constant contact with said spring surface, a second lever pivoted at one end to a pin fixed to the case and movable on its pin by the movement of the first lever and having a projecting lug to trip the holding mechanism to hold the spring against unwinding after it has been wound a predetermined number of turns, until automatically tripped.

2. In combination with a trolley tender of the class described provided with a support including a retrieving spring and holding means to lock the spring in a wound condition, of means pivotally mounted on the support and a plurality of lugs associated with the said means, one lug to engage the peripheral surface of the spring and to move the means in unison with and in accordance with the decrease in diameter of the spring as the spring is wound, spring means to yieldingly hold said lug in contact with the aforesaid spring surface, the other lug arranged to trip the holding means to its locked condition whereby the spring is locked against unwinding after being wound to a predetermined tension until the said holding mechanism is released.

3. A trolley tender comprising in combination a casing, a reel for a trolley pole rope, a retrieving spring, an intermediate member between the reel and spring and normally connected to one end of the spring, pivoted holding means associated with the said member to hold the spring in its wound condition, centrifugal means to lock the reel with the said member when the reel is rotated rapidly by the rope unwinding therefrom and to engage with and trip said holding means to release the spring and member to rotate the reel in a rope winding direction under action of the spring, pivotally mounted means associated with the tender and having its pivotal axis fixed relative to the casing, the last said means arranged to constantly engage the periphery of the spring and to move with the spring in an arc of a circle as the diameter of the spring increases and decreases depending upon whether the spring is being unwound or wound, and pivotally mounted means to transmit said movement to the holding means to set the holding means to its locking position to prevent rotation of the intermediate member after the spring has been wound to a predetermined tension as measured by the diameter of the spring.

4. The combination with a trolley tender comprising a casing, a rope winding reel, a spring connected to the casing to rotate the reel in a rope-winding direction, an intermediate member between the spring and reel and connected to the spring, holding means to lock the member against rotation by the spring and hold the spring in its fully wound condition and to also lock the reel to the member and means on the reel to automatically interlock it with the said member upon rapid rotation of the reel in a rope-unwinding direction and to engage and trip the holding means into locking relation with the last said means, of movable means constantly in cooperative relation with the spring and controlled in movement by the change in diameter of the spring as it is wound and unwound and cooperating with the holding means to set the holding means to its locked position when the spring has been wound to a predetermined diameter.

5. In a trolley retriever for lowering a trolley pole the combination of a casing, a spring-driven rope-winding reel, a spring having one end connected to the casing, an intermediate member connecting the other end of the spring to the reel, holding mechanism to lock the intermediate member against rotation by the spring, a centrifugally operated dog on the reel to interlock with the reel and lock the reel and intermediate member together for unitary rotation and to release the holding mechanism and permit the intermediate member and reel to be rotated by the spring, means on the holding mechanism to engage with the dog to prevent the disengagement of the dog from the intermediate member until the spring is in a fully wound condition and control mechanism associated with and cooperating with the spring and the holding mechanism to control the tensioning of the spring and the locking of the intermediate member to the casing, the last said mechanism including means to engage with the peripheral surface of the spring and also mechanism to engage the holding means whereby the holding mechanism will be tripped to its locking position only when the spring has been wound a predetermined number of turns and means to change the position of the means for tripping the holding mechanism to its holding position, relative to the holding mechanism while the spring is in its unwound condition whereby the number of effective turns of the spring may be adjusted.

REX G. AVERILL.